(12) United States Patent
Herbert

(10) Patent No.: US 6,453,012 B2
(45) Date of Patent: Sep. 17, 2002

(54) X-RAY APPARATUS WITH FILTER COMPRISING FILTER ELEMENTS WITH ADJUSTABLE X-RAY ABSORPTION AND X-RAY ABSORPTION SENSOR

(75) Inventor: Brian Kenneth Herbert, East Grinstead (GB)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/732,590

(22) Filed: Dec. 8, 2000

(30) Foreign Application Priority Data

Dec. 8, 1999 (EP) .............................. 99309883

(51) Int. Cl.$^7$ ................................................ G21K 3/00
(52) U.S. Cl. ........................................ 378/158; 378/156
(58) Field of Search ............................... 378/156, 157, 378/158, 159

(56) References Cited

U.S. PATENT DOCUMENTS

| | | | |
|---|---|---|---|
| 5,625,665 A | 4/1997 | Fokkink et al. ............ | 378/156 |
| 5,778,046 A | 7/1998 | Molloi et al. ............... | 378/159 |
| 6,188,749 B1 * | 2/2001 | Schiller et al. ............ | 378/157 |
| 6,198,806 B1 * | 3/2001 | Prins ........................ | 378/159 |
| 6,269,147 B1 * | 7/2001 | Powell ...................... | 378/158 |
| 2001/0022832 A1 * | 9/2001 | Prins et al. ................ | 378/156 |
| 2001/0040938 A1 * | 11/2001 | Prins ........................ | 378/156 |
| 2001/0043670 A1 * | 11/2001 | Prins ........................ | 378/157 |

* cited by examiner

Primary Examiner—Drew A. Dunn
(74) Attorney, Agent, or Firm—John Vodopia

(57) ABSTRACT

An X-ray device with an X-ray source to produce a beam of X-ray radiation, an X-ray detector to detect this radiation and an X-ray filter with filter elements which is positioned between the X-ray source and the X-ray detector to attenuate the X-ray beam in each independent filter element individually. Even filter element (213) can contain a fluid (32) which is electrically conducting and X-ray absorbing, which is supplied via a transport channel (30), whereas the value of the X-ray absorption of each filter element can discretely adjusted by a stepwise adjustment of the level of the fluid (32) within each filter element. Each filter element comprises a first electrode, which is located in the wall of the filter element and is segmented in the length direction of the filter element (213), the segments being electrically combined in tow subgroups (213, 124) in order to apply an electric potential to the wall segments of the filter element to achieve a step-wise filling of the inner volume (31) by fluid (32). The measuring means (50, 60) are provided to detect the length of the fluid column (32) within the inner volume (31) of the filter element (213).

7 Claims, 5 Drawing Sheets

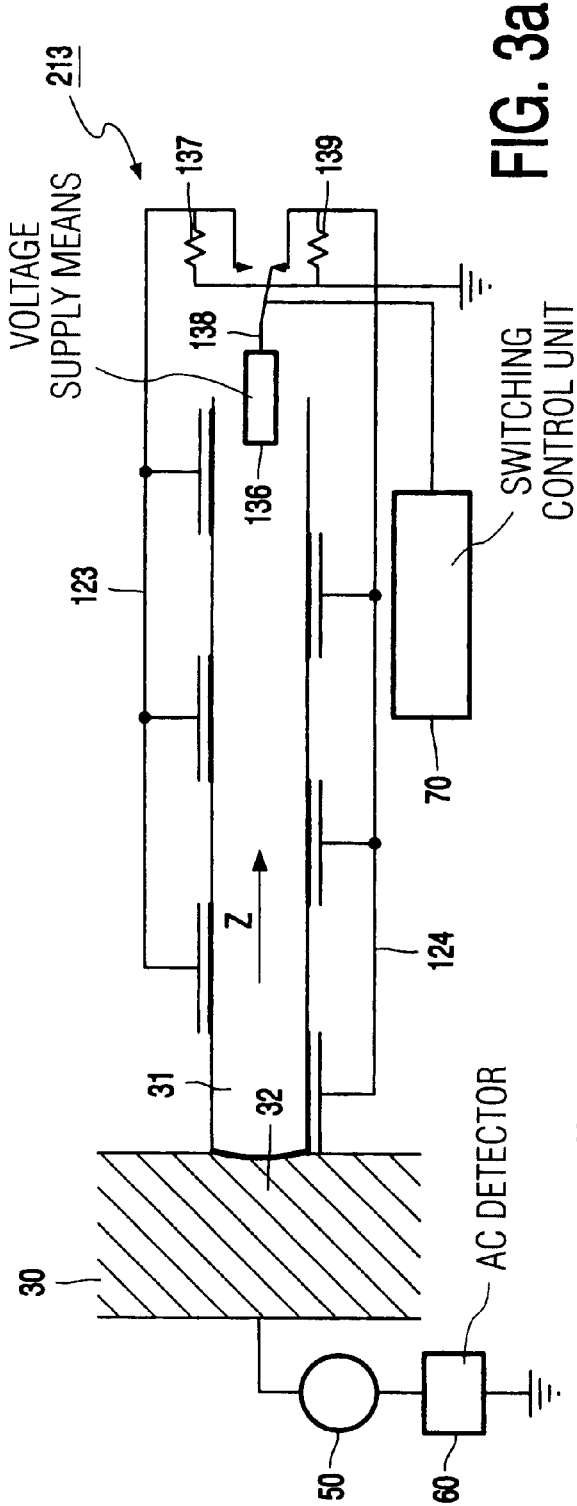

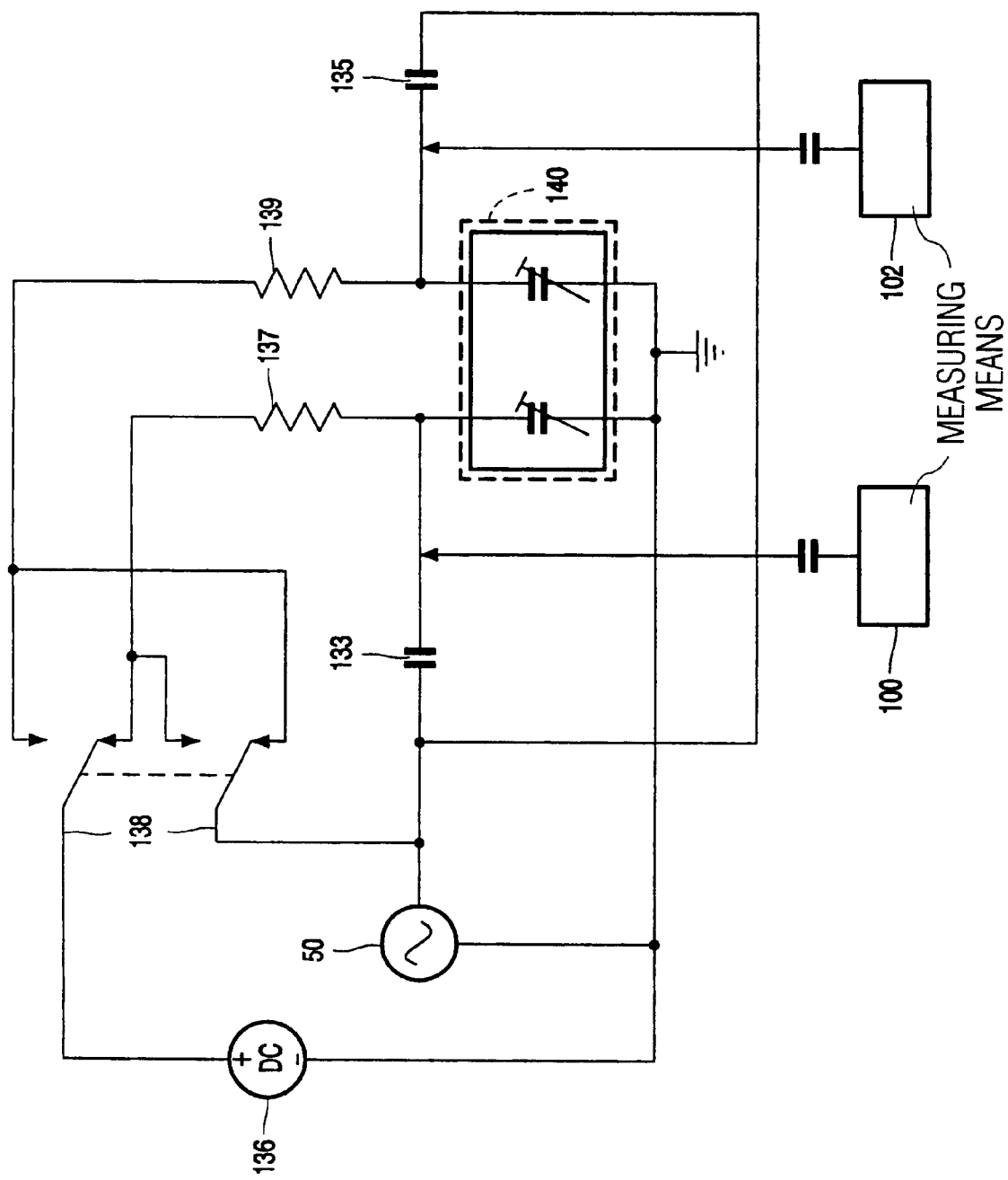

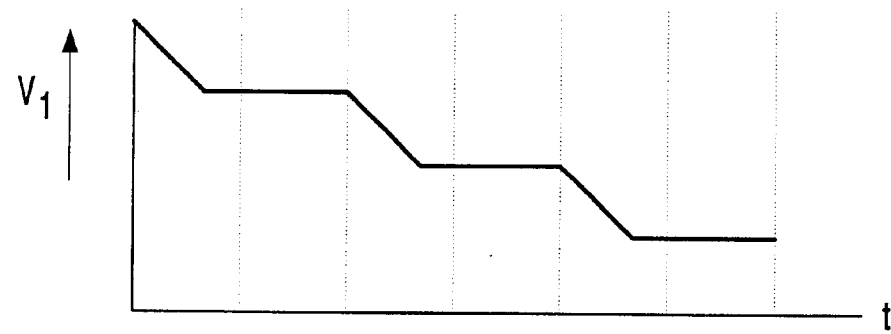
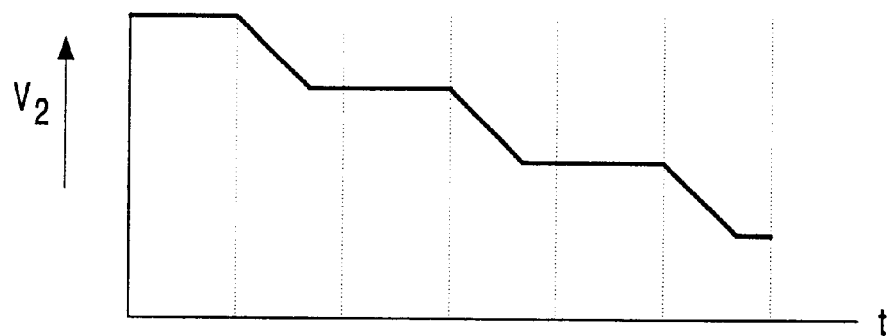
FIG. 4b
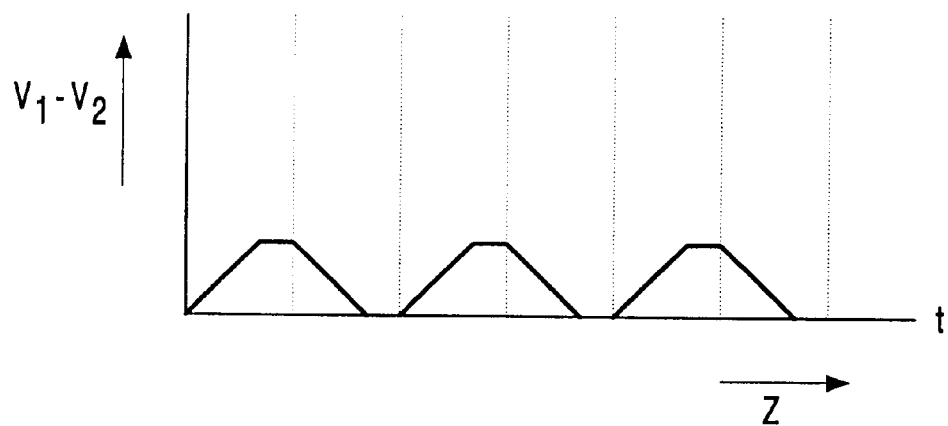
FIG. 4c

X-RAY APPARATUS WITH FILTER COMPRISING FILTER ELEMENTS WITH ADJUSTABLE X-RAY ABSORPTION AND X-RAY ABSORPTION SENSOR

BACKGROUND OF THE INVENTION

The invention relates to the field of X-ray radiography, in particular to an X-ray apparatus with an X-ray source for producing a beam of X-ray radiation, an X-ray detector to detect the X-ray radiation and a filter comprising filter elements containing an X-ray absorbing medium and positioned between the X-ray source and the X-ray detector to absorb the X-ray radiation, in which the X-ray absorption properties of filter elements are individually controllable by changing a length of a column of the X-ray absorbing medium in a propagation direction of the X-ray beam, electrical means being provided, comprising a voltage supply means for the filter elements and an electrical measuring means to measure a quantity which is related to the X-ray absorption properties of individual filter elements.

An X-ray apparatus of this type provided with an X-ray equalization filter to be positioned between the X-ray source and the X-ray detector is known from American U.S. Pat No. 5,778,046. The known X-ray equalization filter comprises an X-ray absorbing mask housed within a shapeable membrane which is positioned in the primary X-ray beam, wherein the local thickness of the mask material can be varied. The known X-ray apparatus can be used in the field of radiodiagnostics, in particular to obtain X-ray transmission images of human body. It is well known that some regions of human body, in particular thorax, have structures of quite different X-ray absorption, which result in pixels on the X-ray detector of different blackening in the X-ray transmission image. The range of the blackening in one X-ray transmission image is defined as dynamic range. The function of the X-ray equalization filter is to compensate the patient regions of low electron density, matching the dynamic range of an X-ray imager in order to obtain a better quality of the X-ray transmission image.

In the known X-ray apparatus a matrix of mechanical pistons is used which can locally modify the length of the column of the X-ray absorbing mask and by doing this, perform a local alteration of the X-ray fluence. The pistons are driven by nickel-titanium wires, wherein the individual length of each nickel-titanium wire is controlled by an electric current applied to the wire. When the electric current is applied to the wire, the wire temperature increases and the wire length decreases. Therefore, there is a certain time necessary for a nickel-titanium wire to shrink or to resume an original length. Further, according to the logistics of the known X-ray apparatus, first a low exposure X-ray image is obtained to calculate the necessary mask profile, then the shaped mask is positioned in the primary X-ray beam. Therefore, there is a considerable time lost for the whole procedure. In the known X-ray apparatus the desired two-dimensional equalization profile of the X-ray absorbing mask is obtained within five seconds. In the field of radio-diagnostics the timing properties of the image acquisition play an important role, especially due to the image artifacts resulting from the movements of the thorax.

Further, the known X-ray equalization filter comprises a limited number of pistons, which is in the order of 8×8 or 16×16. However, for a high quality X-ray diagnostic image this degree of spatial resolution may not be sufficient. Next to this, for the quality assurance purposes and operation control of the X-ray equalization filter it is desirable to have means of a local length detection of the column of the X-ray absorption medium within the filter. In the known X-ray apparatus the position of each piston is sensed during potentiometers which are specifically constructed for that purpose. Due to the movement of the piston with respect to the potentiometer the local resistance in the corresponding electric circuit is varied, whereby it is assumed that the degree of the resistance variation has a direct correlation with the length of the column of the X-ray absorption mask.

OBJECTS AND SUMMARY OF THE INVENTION

It is an object of the present invention to provide an X-ray apparatus with a dynamic beam attenuation filter with a high degree of spatial resolution and a high operation speed, where the length of column the X-ray absorption medium is directly sensed using a simple electrical circuit. This is achieved in the X-ray apparatus according to the invention, which is characterized in that the filter elements are tube-like structures with an inner volume for containing the X-ray absorbing medium being comprised in a fluid filling having electrically conducting and X-ray absorbing properties, the X-ray absorption of each filter element depending on the length of the column of the X-ray absorbing fluid in the inner volume, each filter element comprising a first electrode for supplying a first electric potential to its wall and a second electrode for supplying a second electric potential to the electrically conducting fluid, the first electrode being separated from the electrically conducting fluid by means of an isolator layer so that an electric capacitance is defined between the first electrode and the electrically conducting fluid, the electrical measuring means being further embodied to measure the electric capacitance in individual filter elements.

In the X-ray apparatus according to the invention the high degree of spatial resolution is achieved by constructing a filter comprising a plurality of tube-like filter elements assembled together, each individual filter element containing an X-ray absorption fluid with an individually controllable level of the X-ray absorption fluid within each filter element, the actual level of the X-ray absorption fluid within the filter element being sensed using simple electrical means. The operation of each filter element is based on the known physical effect of electrowetting.

To explain the operation of the filter element different compositions of the X-ray absorption fluid are to be considered. Firstly, the X-ray absorption fluid with electric conduction and X-ray absorption properties can be obtained by dissolving a salt into a liquid (for example, water). The resulting solution is a single component fluid with both electric conducting and X-ray absorbing properties. Apart from this, it is possible to produce a two-component fluid solution, the first fluid component having exclusively electric conducting properties and a negligible degree of X-ray absorption, the second fluid component having exclusively X-ray absorption properties and being an insulator. The resulting solution is a fluid with both electric conducting and X-ray absorbing properties. It is also possible to produce a two-component fluid from two mutually not mixable fluids, the first fluid having mainly electric conducting properties and a negligible degree of X-ray absorption, and the second fluid having mainly X-ray absorption properties and being an insulator. The resulting fluid will contain two fluid columns on top of each other with the corresponding physical properties attributed to a corresponding fluid component.

The essence of the phenomenon of electrowetting is the variation of the contact angle between the electrically conducting fluid on top of the metal and the metal and thus, the variation in the hydrophobicity of the contact surface. For that purpose each filter element comprises a first electrode located in the wall of the filter element in order to bring an electric potential to the wall. A second electrode is located in the inner volume of each filter element in order to bring a second electric potential to the electrically conducting fluid. The first electrode in separated from the inner wall by means of an isolator layer. For a given composition of the filter element there is a set of operation voltages, namely a 'fill' voltage to fill the filter element with the electrically conducting fluid, a 'hold' voltage to hold the meniscus of the electrically conducting fluid on the desired level and an 'empty'0 voltage to initiate the emptying process of the filter element. The operation of the filter element of this type is known and is described in more detail in American U.S. Pat. No. 5,625,665 (PHN 15044). In case the X-ray absorption medium is a single component fluid or a solution of the electrically conducting fluid component and the X-ray absorbing fluid component, there is a single liquid column within the filter element, the level of which defines the degree of X-ray absorption. In the case the X-ray absorbing fluid has more than one, for example two not mutually mixing components, there are two separate fluid columns in the inner volume of the filter element in the X-ray propagation direction, having a mutual separation plane perpendicular to the X-ray propagation direction, whereas the length of the column of the X-ray absorbing fluid component within the filter element and, thus, the degree of the X-ray absorption is passively defined by the length of the column of the electrically conducting fluid component.

Due to the fact that the first electrode is separated from the electrically conducting fluid component by the isolator layer, an electric capacitance is created. The value of the electric capacitance is a direct measure for the degree of filling by the electrically conducting fluid component. An embodiment of an X-ray filter to be used in an X-ray apparatus of the invention is characterized in that the electric measuring means comprise an electric circuit with an AC source for providing an AC current to the first and second electrodes of individual filter elements and also comprising an AC detector to measure an AC signal induced by said current within individual filter elements. In this way in order to sense the level of the electrically conducting fluid component the electric measuring means comprising a simple electrical circuit are proposed to measure the electric capacitance.

In order to prevent the AC current from interfering with voltage supply means of the first electric potential a further embodiment of the filter according to the invention is characterized in that the electric measuring means comprise a further circuit element connected in series with the respective electric capacitance to form a voltage divider. A preferred embodiment for the circuit element, but not limited to it, is an additional electric capacitance.

Also, in order to prevent an electric interference between the first electric potential and an AC path, a fourth embodiment of the filter according to the invention is characterized in that the voltage supply means comprise a high impedance for supplying the first electric potential to individual filter elements.

In many radiodiagnostic applications it may be desirable to have a possibility of grey values per filter element, instead of working with filter elements which are either empty or full. One of the possible solutions for that problem is to divide the first electrode into a stack of electrode segments in the X-ray propagation direction. The control of the filter element filling in this case is achieved by the proper switching of the 'fill' voltage between the segments. A fifth embodiment of the filter according to the invention is characterized in that the first electrodes of individual filter elements comprise a stack of segments in the X-ray propagation direction, wherein the neighbouring segments are mutually electrically isolated, the first electric potential being switchable between the segments by the voltage supply means to alter the length of the column of the X-ray absorbing fluid in the X-ray propagation direction, the amplitude of the AC signal being a function of time, control means being provided for controlling the switching of the first electric potential between the segments in dependence of the behavior of the AC signal with time.

This embodiment is based on the insight that during the filling of a segment of the filter element by the electrically conducting fluid component, the electric capacitance per filter element is an increasing function with time. When a corresponding segment is filled and no 'fill' voltage is applied to the following segment, the electric capacitance reaches the saturation region. This region can be used as a trigger to set the 'fill' voltage to the next segment, if the fluid propagation within the inner volume of the filter element is desired. For that purpose, a sixth embodiment of the filter according to the invention is characterized in that the control means are conceived to switch the first electric potential between the segments triggered by the AC signal reaching a saturation region. The switching of the 'fill' voltage between the consequent segments is a time critical procedure, as the meniscus of the electrically conducting liquid must be situated in the vicinity of the following segment in order to feel the pulling force of the electrowetting power of the next segment. The saturation region of the electric capacitance curve indicates that the meniscus has arrived at the vicinity of the next segment and, therefore, the switching can be enabled.

BRIEF DESCRIPTION OF THE DRAWINGS

These and other aspects of the invention will be explained with reference to the drawings, in which the same reference signs indicate corresponding elements, wherein

FIGS. 3a, 3b and 3c are schematic functional representations of the filter element of FIGS. 2a and 2b where the first electrode is segmented and forms two electric subgroups;

FIG. 4a is an equivalent electric circuit of a filter element of FIG. 3a, FIG. 4b is a timing diagram for signals $V_1$ and $V_2$, and FIG. 4c shows the difference of $V_1$ and $V_2$ of FIG. 4b.

DETAILED DESCRIPTION OF THE PREFERRED EMBODIMENTS

Figure 1:
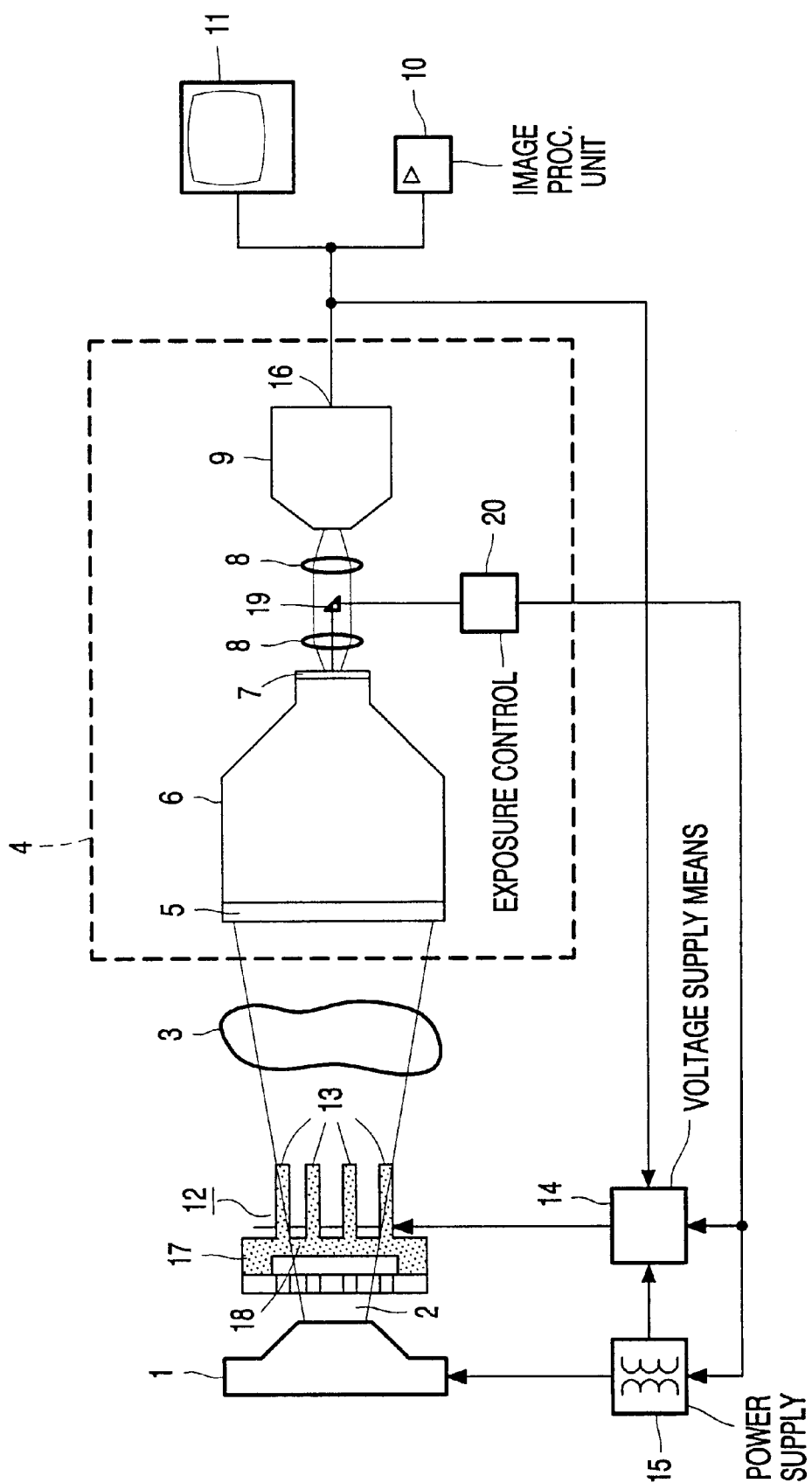
FIG. 1 presents a schematic view of an X-ray apparatus comprising a filter in accordance with the invention.

FIG. 1 presents a schematic view of an X-ray apparatus comprising a filter in accordance with the invention. The X-ray source 1 emits an X-ray beam 2 whereto an object 3, for example a patient to be examined, is exposed. As a result of local differences in the absorption of X-rays in the object 3 an X-ray image is formed on the X-ray detector 4 which is in this case an image intensifier pick-up chain. The X-ray image is formed on the entrance screen 5 of the X-ray intensifier 6 and is converted into a light image on the exit window 7, which light image is imaged on a video camera 9 by means of a lens system 8. The video camera 9 forms an electronic image signal from the light image. The electronic image signal is applied, for example for further processing, to an image processing unit 10 or to a monitor 11 on which the image information in the X-ray image is displayed.

Between the X-ray source 1 and the object 3 there is arranged a filter 12 for local attenuation of the X-ray beam 2 by means of various filter elements 13 in the form of tube-like structures in line with the X-ray beam, whose X-ray absorptivity can be adjusted by application of electric voltages to an electrode located in a wall of each filter element. The electric voltages are adjusted by voltage supply means 14 on the basis of, for example brightness values of the X-ray image and/or on the basis of the setting of the X-ray source; to this end, the adjusting circuit is coupled to the power supply 15 of the X-ray source and to the output terminal 16 of the video camera 9.

Part of the light of the exit window is guided, by way of a splitting prism 19, to an exposure control system 20 which derives a control signal from the light image in order to control the high voltage supply on the basis of image information of the image on the exit window. In order to receive image information of the image on the exit window 7, the voltage supply means 14 of the filter 12 are coupled to the exposure control system 20, so that the filter 12 can be adjusted on the basis of the image on the exit window 7.

The filter 12 is constructed and oriented in such a way that the filter elements 13 extend approximately in the propagation direction of the X-ray beam 2; a uniform spatial resolution of the spatial X-ray absorption pattern is thus achieved across the cross-section of the X-ray beam. Alternatively, the filter 12 can also be constructed in such a manner that the filter elements 13 extend approximately parallel to one another; when the X-ray beam 2 diverges, it is thus achieved that substantially all X-rays pass at least partly through a filter element, so that the X-ray cannot pass between two filter elements without being attenuated. The voltage supply means apply electric voltages to the electrodes located in the walls of the filter elements 13 so as to influence the adhesion of the X-ray absorption fluid to the inner surface of filter elements. In order to adjust a filter element to a high X-ray absorptivity, an electric voltage of the first value is applied to the wall of the relevant filter element by the voltage supply means 14, the relevant filter element then being filled with the X-ray absorbing fluid from the reservoir 17 via supply channels 18 by strong adhesion of the X-ray absorbing fluid to the inner side. In order to adjust a filter element to a low X-ray absorptivity, the voltage supply means 14 apply an electric voltage of the second value, for example equal to the potential of a reference electrode in the inner volume of the filter element, to the wall of the filter element, the X-ray absorbing fluid the exhibiting poor adhesion to the inner surface of the filter element, so that this filter element is not filled with the X-ray absorbing fluid from the reservoir 17. The general construction of the filter 12 and the composition of the X-ray absorbing fluid is described in more detail in American U.S. Pat. No. 5,625,665 (PHN 15.044). The construction of a filter element is described in more detail with reference to FIG. 2.

Figure 2A:
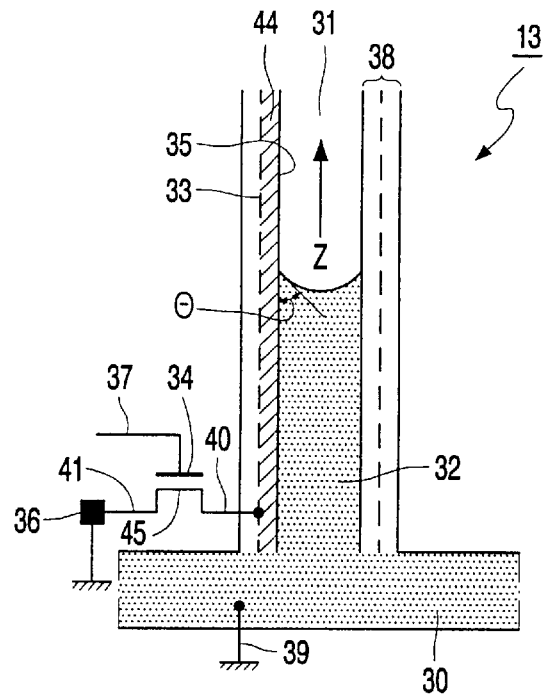
FIGS. 2a and 2b are diagrammatic sectional views of a filter element of the filter of FIG. 1.

FIG. 2a presents a schematic sectional view of a filter element 13 of the filter 12 of FIG. 1. The filter element 13 is filled by the X-ray absorption fluid 32 via a supply channel 30. In this case the X-ray absorption fluid 32 forms one homogeneous liquid which combines electrically conducting properties and X-ray absorbing properties. For each filter element in the filter 12 one defines a length direction z and an inner volume 31, which volume is limited by the walls 38 of the corresponding filter element. Each filter element comprises a first electrode 33 located in the wall 38 in the form of an electrically conducting layer being electrically isolated form the inner volume 31 by means of en isolator layer 44, an inert coating layer 35 being located on the inner surface of the walls 38 and a second electrode 39 to supply an electrical potential to the X-ray absorption fluid 32. The electrically conducting layer 33 of the filter element 13 is coupled to a switch, which is this example is a drain contact 40 of a field effect transistor 45, which source contact 41 is connected to voltage supply means 36. The field effect transistor 45 is put in a conduction mode, in other words the switching element is closed by a control voltage from a control voltage supply line 37 supplied to a gate contact 34 of the field effect transistor 45. By doing this, one applies an electric voltage to the first electrode 33 from the voltage supply means 36. When the voltage supply means 36 supply a voltage of the 'fill'-voltage value, the contact angle θ formed by the meniscus of the X-ray absorption fluid 32 with the inert coating layer 35 decreases and the filter element 13 is filled with the X-ray absorption fluid.

Figure 2B:
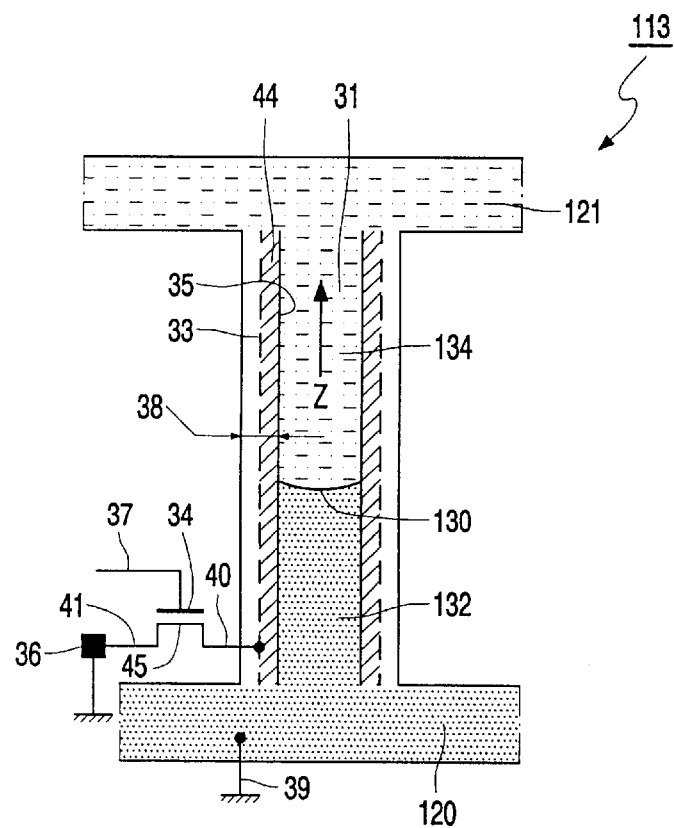

FIG. 2b shows a schematic section of a filter element 113 of the filter 12 of FIG. 1 in case the X-ray absorption fluid comprises two mutually not mixable first and second fluid components, wherein the first fluid component 132 is a liquid with electrically conducting properties and neglectable X-ray absorption properties and the second fluid component 134 is an electrically isolating liquid with high X-ray absorption properties, each fluid component being supplied to the filter element 113 from its own supply channel 120 and 121, respectively. The other functional parts of the filter element 113 are similar to those of the filter element of the FIG. 2a, resulting in a similar control of the level of the first component in the inner volume 31 of the filter element 113. The level of the second fluid component in the inner volume of the filter element is, thus, passively determined by the level of the first fluid component therein, due to the fact that these two fluids have a mutual separation plane 130. It is also possible to design a filter element, where the first and second fluid components do not have a mutual plane, but are separated by a layer of a gaseous phase, which is further not shown in the FIG. 2b. The degree of the X-ray absorption in these cases is determined by the length of the column of the second component in the inner volume of the filter element 113.

FIG. 3 gives a schematic functional representation of a filter element of FIG. 2, where the first electrode is segmented in the length direction z of the filter element 213 and forms two electric subgroups 123 and 124, respectively. The function of the filter element will be described for the case that the X-ray absorption fluid 32 is a liquid solution between an electrically conducting fluid component and an X-ray absorbing fluid component and is supplied into the filter element 213 from the supply channel 30. FIG. 3a presents a schematic view on the subgroups 123 and 124 of the filter element that are controlled by the voltage supply means 136. An electrical switch 138 alters the voltage supply from one subgroup of electrode segments to another. Also, FIG. 3a gives a schematic representation of the fluid level detection circuit, comprising an AC source 50 in the form of a sinus wave generator and an AC detector 60. A switching control unit 70 performs a timing control of the voltage switching between subgroups 123 and 124 by the switch 138. FIG. 3b gives a temporal representation of the voltage pulses as supplied by the voltage supply means 136 to the corresponding subgroups of the first electrode. In order to transport the X-ray absorption fluid 32 from the supply channel 30 into the inner volume 31 of the filter element 213 and further on within the inner volume, the electrical switching between the subgroups of the first electrode has to be performed in a controlled way by the switching control unit 70, based on the results of the fluid level detection within each segment. FIG. 3c presents the corresponding course of the signal s from the AC detector 60 with time. From the FIG. 3c it follows that each rising part 90 of the signal s of the AC detector 60 corresponds to the fluid rising within a corresponding segment and each plateau 92 corresponds to the moment in time when the fluid has filled the corresponding segment. The insight of this interpretation is based on the equivalent electric circuit of the filter element of this type, which is given by FIG. 4. FIG. 4 presents an equivalent electrical circuit for a detection of the fluid level within a filter element, wherein the first electrode in segmented and two electrical subgroups based on resulting segments are formed. From FIG. 4a it follows that each subgroup of segments can be described by a variable electric capacitance 140, which is formed between each subgroup of segments and the fluid, the value of the capacitance being a function of the degree of filling of that subgroup by the fluid. The voltage supply means 136, initiating the filling of a subgroup of the filter elements, supply the voltage to these subgroups via switch 138. The measuring means comprise an AC source 50 and the electrical circuit of the detectors 100 and 102. In order to prevent the AC signal from being shorted by the voltage supply means 136, resistors 137 and 139 in the MΩ range are provided between the AC source 50 and the voltage supply means 136. For measuring the electric capacitance of a filter element 140, a capacitive voltage divider is provided, comprising the equivalent capacitance from each subgroup 140 and an additional electric capacitances 133 and 135, which are in this example in the order of 20 pF. FIG. 4b presents the resulting signals V1 and V2 as measured by the measuring means 100 and 102, respectively. In this example the detected signal is the voltage across the segment. As the fluid rises within the segment, the corresponding electric impedance of the segment decreases, leading to the decrease of the voltage across the segment. When the fluid has risen to the maximum level, the measured voltage reaches a constant value. FIG. 4c gives a further improvement of the detection method of the fluid level within the filter element. According to the FIG. 4a, the measuring means 100 and 102 can supply the signals from the detector to the difference amplifier 101, schematically sketched in the FIG. 4c, with the resulting signal 103 at the output of the difference amplifier as given in the graph of FIG. 4c. By detecting the plateau of this signal the switching between the corresponding subgroups can be enabled.

What is claimed is:

1. An X-ray apparatus with an X-ray source for producing a beam of X-ray radiation, an X-ray detector to detect the X-ray radiation and a filter comprising filter elements containing an X-ray absorbing medium and positioned between the X-ray source and the X-ray detector to absorb the X-ray radiation, in which the X-ray absorption properties of filter elements are individually controllable by changing a length of a column of the X-ray absorbing medium in a propagation direction of the X-ray beam, electrical means being provided, comprising a voltage supply means for the filter elements and an electrical measuring means to measure a quantity which is related to the X-ray absorption properties of individual filter elements, wherein the filter elements are tube-like structures with an inner volume for containing the X-ray absorbing medium being comprised in a fluid filling having electrically conducting and X-ray absorbing properties, the X-ray absorption of each filter element depending on the length of the column of the X-ray absorbing fluid in the inner volume, each filter element comprising a first electrode for supplying a first electric potential to its wall and a second electrode for supplying a second electric potential to the electrically conducting fluid, the first electrode being separated from the electrically conducting fluid by means of an isolator layer so that an electric capacitance is defined between the first electrode and the electrically conducting fluid, the electrical measuring means being further embodied to measure the electric capacitance in individual filter elements.

2. An X-ray filter to be used in the X-ray apparatus of claim 1, wherein the electric measuring means comprises an electric circuit with an AC source for providing an AC current to the first and second electrodes of individual filter elements and an AC detector to measure an AC signal induced by said current within individual filter elements.

3. An X-ray filter as claimed in claim 2, wherein the electric measuring means comprise a further circuit element connected in series with the respective electric capacitance to form a voltage divider.

4. An X-ray filter as claimed in claim 3, wherein the further circuit element is an additional electric capacitance.

5. An X-ray filter as claimed in claim 2, wherein the voltage supply means comprise a high impedance for supplying the first electric potential to individual filter elements.

6. An X-ray filter as claimed in claim 2, wherein the first electrodes of individual filter elements comprise a stack of segments in the X-ray propagation direction, wherein the neighbouring segments are mutually electrically isolated, the first electric potential being switchable between the segments by the voltage supply means to alter the length of the column of the X-ray absorbing fluid in the X-ray propagation direction, the amplitude of the AC signal being a function of time, control means being provided for controlling the switching of the first electric potential between the segments in dependence of the behavior of the AC signal with time.

7. An X-ray filter as claimed in claim 6, wherein the control means are conceived to switch the first electric potential between the segments triggered by the AC signal reaching a saturation region.

* * * * *